United States Patent
Lee et al.

(10) Patent No.: US 11,396,579 B2
(45) Date of Patent: Jul. 26, 2022

(54) POLYESTER FILM AND MANUFACTURING METHOD THEREOF

(71) Applicant: SK CHEMICALS CO., LTD., Gyeonggi-do (KR)

(72) Inventors: Yoo Jin Lee, Gyeonggi-do (KR); Sung-Gi Kim, Gyeonggi-do (DE); Boo-youn Lee, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/625,114

(22) PCT Filed: Jun. 25, 2018

(86) PCT No.: PCT/KR2018/007177
§ 371 (c)(1),
(2) Date: Dec. 20, 2019

(87) PCT Pub. No.: WO2019/004679
PCT Pub. Date: Jan. 3, 2019

(65) Prior Publication Data
US 2020/0148816 A1 May 14, 2020

(30) Foreign Application Priority Data

Jun. 26, 2017 (KR) .................. 10-2017-0080705

(51) Int. Cl.
| | | |
|---|---|---|
| *C08G 63/672* | (2006.01) | |
| *C08J 5/18* | (2006.01) | |
| *C08K 5/098* | (2006.01) | |
| *B32B 27/08* | (2006.01) | |
| *B29C 48/00* | (2019.01) | |
| *B29C 48/08* | (2019.01) | |
| *B29C 55/14* | (2006.01) | |
| *B32B 27/36* | (2006.01) | |
| *B29K 67/00* | (2006.01) | |

(52) U.S. Cl.
CPC ........ *C08G 63/672* (2013.01); *B29C 48/0018* (2019.02); *B29C 48/08* (2019.02); *B29C 55/143* (2013.01); *B32B 27/08* (2013.01); *B32B 27/36* (2013.01); *C08J 5/18* (2013.01); *C08K 5/098* (2013.01); *B29K 2067/003* (2013.01); *B29K 2995/0041* (2013.01); *B29K 2995/0053* (2013.01); *C08J 2367/02* (2013.01)

(58) Field of Classification Search
CPC .......... C08G 63/672; C08J 5/18; C08K 5/098; B32B 27/08; B32B 27/36; B29C 48/0018; B29C 48/08; B29C 55/143
USPC ...................................................... 428/213
See application file for complete search history.

(56) References Cited

U.S. PATENT DOCUMENTS

| | | | |
|---|---|---|---|
| 4,060,516 A | 11/1977 | Kuratsuji et al. | |
| 5,521,278 A | 5/1996 | O'Brien et al. | |
| 5,959,066 A | 9/1999 | Charbonneau et al. | |
| 6,025,061 A | 2/2000 | Khanarian et al. | |
| 6,063,464 A * | 5/2000 | Charbonneau | C08G 63/668 428/36.92 |
| 6,063,465 A | 5/2000 | Charbonneau et al. | |
| 6,063,495 A * | 5/2000 | Charbonneau | D01F 6/86 428/364 |
| 6,126,992 A * | 10/2000 | Khanarian | G11B 7/2535 427/162 |
| 6,140,422 A * | 10/2000 | Khanarian | C08L 71/00 525/176 |
| 6,359,070 B1 | 3/2002 | Khanarian et al. | |
| 6,699,546 B2 | 3/2004 | Tseng | |
| 2003/0232959 A1 | 12/2003 | Adelman et al. | |
| 2004/0092703 A1 | 5/2004 | Germroth et al. | |
| 2007/0059465 A1 | 3/2007 | Thompson et al. | |
| 2012/0040167 A1 | 2/2012 | Kim et al. | |
| 2012/0177854 A1 | 7/2012 | Lee et al. | |
| 2012/0207993 A1 | 8/2012 | Joo et al. | |
| 2013/0295306 A1 | 11/2013 | Kim et al. | |
| 2013/0319525 A1 | 12/2013 | Nakai | |
| 2014/0011976 A1* | 1/2014 | Kim | C08G 63/60 528/302 |
| 2016/0130415 A1* | 5/2016 | Miyasaka | C08J 5/18 428/355 N |
| 2016/0185510 A1 | 6/2016 | Degroote et al. | |
| 2016/0222157 A1 | 8/2016 | Lee et al. | |

(Continued)

FOREIGN PATENT DOCUMENTS

| | | | |
|---|---|---|---|
| CA | 2940858 A1 * | 10/2015 | ........... C09D 167/02 |
| CN | 1298343 | 6/2001 | |

(Continued)

OTHER PUBLICATIONS

Machine_English_translation_KR_20170037588_A; 14-Polyester resin copolymerized with isosorbide and 14-cyclohexane dimethanol and preparing method thereof; Apr. 3, 2017; EPO; whole document (Year: 2017).*

International Search Report for International (PCT) Patent Application No. PCT/KR2018/007177, dated Oct. 2, 2018, 2 pages.

International Search Report and Written Opinion for International (PCT) Patent Application No. PCT/KR2018/007177, dated Oct. 2, 2018, 10 pages.

International Search Report and Written Opinion for International (PCT) Patent Application No. PCT/KR2018/006111, dated Sep. 6, 2018, 13 pages.

(Continued)

*Primary Examiner* — Tahseen Khan
(74) *Attorney, Agent, or Firm* — Sheridan Ross P.C.

(57) ABSTRACT

The present invention relates to a polyester film and a preparation method thereof. The polyester film is formed of a polyester resin having a specific content of isosorbide and diethylene glycol introduced therein, containing a low content of oligomer, and exhibiting a specific intrinsic viscosity, thereby exhibiting excellent mechanical properties, heat resistance and chemical resistance, and good heat sealability.

27 Claims, No Drawings

(56) References Cited

U.S. PATENT DOCUMENTS

| | | | |
|---|---|---|---|
| 2017/0136747 A1* | 5/2017 | Torradas | B32B 27/08 |
| 2017/0144420 A1* | 5/2017 | Lim | C09D 167/02 |
| 2017/0166746 A1 | 6/2017 | Maeda et al. | |
| 2018/0155493 A1 | 6/2018 | Jacquel et al. | |
| 2020/0087450 A1 | 3/2020 | Lee et al. | |
| 2020/0172662 A1 | 6/2020 | Lee et al. | |
| 2020/0173060 A1 | 6/2020 | Lee et al. | |

FOREIGN PATENT DOCUMENTS

| | | |
|---|---|---|
| CN | 1298346 | 6/2001 |
| CN | 1298416 | 6/2001 |
| CN | 1298426 | 6/2001 |
| CN | 1298461 | 6/2001 |
| CN | 1711302 | 12/2005 |
| CN | 102498150 | 6/2012 |
| CN | 105392816 | 3/2016 |
| EP | 2857433 | 4/2015 |
| EP | 3395855 | 10/2018 |
| EP | 3441414 | 2/2019 |
| JP | S50-14818 | 2/1975 |
| JP | S50-18722 | 2/1975 |
| JP | H11-323658 | 11/1999 |
| JP | 2002-512304 | 4/2002 |
| JP | 2002-512315 | 4/2002 |
| JP | 2006-070101 | 3/2006 |
| JP | 2006-214057 | 8/2006 |
| JP | 2010-215770 | 9/2010 |
| JP | 2012-126821 | 7/2012 |
| JP | 2013-047317 | 3/2013 |
| JP | 5752617 | 7/2015 |
| JP | 5903980 | 4/2016 |
| JP | 2016-529171 | 9/2016 |
| KR | 10-2001-0034803 | 4/2001 |
| KR | 10-2001-0034804 | 4/2001 |
| KR | 10-2001-0034807 | 4/2001 |
| KR | 10-2001-0034808 | 4/2001 |
| KR | 10-2001-0034809 | 4/2001 |
| KR | 10-0504063 | 7/2005 |
| KR | 10-2006-0007447 | 1/2006 |
| KR | 10-2010-0113769 | 10/2010 |
| KR | 10-2011-0039185 | 4/2011 |
| KR | 10-2012-0072484 | 7/2012 |
| KR | 10-2015-0062234 | 6/2015 |
| KR | 10-2015-0077993 | 7/2015 |
| KR | 10-2016-0037940 | 4/2016 |
| KR | 10-2016-0083399 | 7/2016 |
| KR | 10-2017-0037588 | 4/2017 |
| KR | 20170037588 A * | 4/2017 |
| TW | 201615742 | 5/2016 |
| TW | 201700529 | 1/2017 |
| TW | 201713707 | 4/2017 |
| WO | WO 99/54119 | 10/1999 |
| WO | WO 2012-105770 | 8/2012 |
| WO | WO 2016/125860 | 8/2016 |

OTHER PUBLICATIONS

Translated International Search Report for International (PCT) Patent Application No. PCT/KR2018/006111, dated Sep. 6, 2018, 3 pages.
International Search Report and Written Opinion for International (PCT) Patent Application No. PCT/KR2018/006858, dated Nov. 29, 2018, 12 pages.
International Search Report and Written Opinion for International (PCT) Patent Application No. PCT/KR2018/006322, dated Sep. 10, 2018, 11 pages.
Translated International Search Report for International (PCT) Patent Application No. PCT/KR2018/006322, dated Sep. 10, 2018, 2 pages.
Official Action for U.S. Appl. No. 16/615,500, dated Sep. 30, 2020 10 pages.
Official Action for U.S. Appl. No. 16/624,148, dated Oct. 14, 2020 10 pages.
Official Action for U.S. Appl. No. 16/616,078, dated Oct. 20, 2020 12 pages.
Extended Search Report for European Patent Application No. 18809897.4, dated Dec. 9, 2020, 7 pages.
Extended Search Report for European Patent Application No. 18819852.7, dated Mar. 11, 2021, 9 pages.
Official Action for U.S. Appl. No. 16/615,500, dated Mar. 23, 2021 10 pages.
Official Action for U.S. Appl. No. 16/624,148, dated Mar. 23, 2021 10 pages.
Official Action for U.S. Appl. No. 16/615,078, dated Apr. 21, 2021 14 pages.
Official Action for U.S. Appl. No. 16/615,500, dated Aug. 24, 2021 11 pages.
Official Action for U.S. Appl. No. 16/624,148, dated Aug. 24, 2021 11 pages.
Official Action for U.S. Appl. No. 16/616,078, dated Aug. 27, 2021 11 pages.
Official Action for U.S. Appl. No. 16/615,500, dated Jan. 27, 2022 8 pages.
Official Action for U.S. Appl. No. 16/624,148, dated Jan. 27, 2022 8 pages.

* cited by examiner

POLYESTER FILM AND MANUFACTURING METHOD THEREOF

CROSS-REFERENCE TO RELATED APPLICATION(S)

This application is a national stage application under 35 U.S.C. 371 and claims the benefit of PCT Application No. PCT/KR2018/007177 having an international filing date of 25 Jun. 2018, which designated the United States, which PCT application claims the benefit of priority from Korean Patent Application No. 10-2017-0080705 filed on Jun. 26, 2017 with the Korean Intellectual Property Office, the disclosures of each of which are incorporated herein by reference in their entireties.

TECHNICAL FIELD

The present invention relates to a polyester film and a preparation method thereof.

BACKGROUND

PET (polyethylene terephthalate) represented by a polyester resin is widely used as materials such as an optical film, an electric insulation film, a packaging film, a laminate film, and various protective films due to its low price and excellent mechanical/chemical/electrical properties. However, PET has poor heat resistance. Thus, the heat resistance of the PET film is increased through a heat setting step at a high temperature, but when the PET film is exposed to a high temperature for a long time, there is a problem that oligomers are precipitated on the surface of the film and crystallized, thereby lowering transparency. In order to prevent such a problem, a method of adding a separate process such as coating has been proposed, but there are problems that the manufacturing process is complicated, defects occur during post-processing, and contamination occurs.

In a process in which molding such as printing is applied to a film, the method applied at a high temperature of around 80° C. tends to increase due to reasons such as improvement in productivity. However, the glass transition temperature of PET is 80° C. or less, and when the molding process such as printing is performed at a high temperature, the probability of occurrence of defects remarkably increases. Further, when the chemical resistance is weak due to the solvent used for printing, transparency and surface defects are likely to occur.

In addition, PET has a high crystallinity, especially possesses high crystallinity at the time of biaxial drawing and there is also problem that PET is disadvantageous in terms of heat sealability. Accordingly, a film used for optical application has a low oligomer content even in a high-temperature process and thus is required to have a high transparency. In addition, in order to provide a film to be used for printing and the like, it is necessary to develop a material capable of having high heat resistance and chemical resistance and thus improving productivity.

In particular, there is a further need for studies on a polyester film having properties capable of improving the heat sealability by controlling the crystallinity in industrial or packaging applications, etc.

Technical Problem

The present invention provides a polyester film having high transparency, high heat resistance, chemical resistance and improved heat sealability.

Further, the present invention provides a method for preparing the above-mentioned polyester film.

Technical Solution

In order to achieve the objects above, according to one embodiment of the present invention, there is provided a polyester film comprising a resin layer formed from a polyester resin which has an alternating structure of an acid moiety derived from a dicarboxylic acid or a derivative thereof and a diol moiety derived from a diol, which contains 1 to 30 mol % of a diol moiety derived from isosorbide and 2 to 5 mol % of a diol moiety derived from diethylene glycol based on the total diol moieties derived from the diol, and which has an oligomer content with a molecular weight ranging from 500 to 1000 g/mol of 1.3% by weight or less based on the total weight of the resin, wherein the polyester film is a polyester film biaxially drawn in the longitudinal and transverse directions, and wherein a haze measured according to ASTM D1003-97 is 2% or less when the thickness of the polyester film is 20 μm, and a haze variation after heat treatment of the polyester film at 150° C. for 1 hour (haze variation (%)=haze (%) after heat treatment−haze (%) before heat treatment) is 2% or less.

According to another embodiment of the present invention, there is provided a method for preparing the above-mentioned polyester film.

Advantageous Effects

As the polyester film according to the present invention is formed of a polyester resin containing a small amount of oligomers, it can prevent precipitation of oligomers in a post-process at a high temperature, maintain a low haze value even after heat treatment, is excellent in heat resistance and chemical resistance, and exhibit good heat sealability. Accordingly, the polyester film can be used in various applications such as an industrial film, a film for food container, a packaging film, an optical film, an insulating film, or a printing film.

DETAILED DESCRIPTION OF THE EMBODIMENTS

Hereinafter, a polyester film and a preparation method thereof according to specific embodiments of the invention will be described.

Unless otherwise specified, the terminology used herein is for the purpose of describing particular embodiments only and is not intended to limit the scope of the invention. Further, the singular forms "a," "an" and "the" are intended to include the plural forms as well, unless the context clearly indicates otherwise. In addition, it will be further understood that the meaning of the terms "comprise", "include" as used herein is intended to specify the presence of stated features, ranges, integers, steps, operations, elements and/or components, but does not preclude the presence or addition of other features, ranges, integers, steps, operations, elements and/or components.

According to one embodiment of the present invention, there is provided a polyester film comprising a resin layer formed from a polyester resin which has an alternating structure of an acid moiety derived from a dicarboxylic acid or a derivative thereof and a diol moiety derived from a diol, which contains 1 to 30 mol % of a diol moiety derived from isosorbide and 2 to 5 mol % of a diol moiety derived from diethylene glycol based on the total diol moieties derived from the diol, and which has an oligomer content with a molecular weight ranging from 500 to 1000 g/mol of 1.3% by weight or less based on the total weight of the resin, wherein the polyester film is a polyester film biaxially drawn in the longitudinal and transverse directions, and wherein a haze measured according to ASTM D1003-97 is 2% or less when the thickness of the polyester film is 20 μm, and a haze variation after heat treatment of the polyester film at 150° C. for 1 hour (haze variation (%)=haze (%) after heat treatment−haze (%) before heat treatment) is 2% or less.

In the case of PET which is represented by a polyester resin, the regularity of the polymer chain is high and a haze is easily generated due to a fast crystallization rate, and thus its use in applications requiring high transparency has been limited.

In order to solve these problems, a method of introducing isosorbide into the backbone of conventional polymers has been introduced. However, residues derived from isosorbide deteriorated the regularity of the polymer chain, which in turn deteriorated the crystallization rate of the resin. In order to ensure sufficient transparency, the polyester resin should contain a large amount of diol moieties derived from isosorbide, but this caused a problem that the polyester resin could not function as a crystalline resin due to the large amount of diol moieties derived from isosorbide. In addition, non-crystalline resins have low regularity of the molecular structure and so cannot be formed by drawing. Due to these problems, there was a limitation on the content of isosorbide that can be introduced into the polymer backbone.

Regardless of these technical limitations, the polyester film according to one embodiment of the present invention can be formed from a polyester resin containing diol moieties derived from isosorbide and diethylene glycol in the above-mentioned range, and thus can exhibit not only high transparency but also improved heat resistance, chemical resistance and heat sealability, and further can exhibit excellent mechanical properties.

Specifically, the polyester resin can contain the diol moiety derived from isosorbide in an amount of 1 to 30 mol %, 3 to 27 mol %, 5 to 25 mol %, 7 to 23 mol %, 9 to 25 mol %, or 9 to 20 mol based on the total diol moieties. Also, the polyester resin can contain the diol moiety derived from diethylene glycol in an amount of 2 to 5 mol %, 3 to 5 mol %, or 3.5 to 4.5 mol % based on the total diol moieties.

In addition, the polyester resin can contain oligomers in an amount of 1.3 wt % or less, 1.0 wt % or less, or 0.9 wt % or less based on the total weight of the resin. Since there is a possibility that the polyester resin does not contain an oligomer, the lower limit of the oligomer content may be 0 wt %. The oligomer as used herein refers to a compound having a molecular weight of 500 to 1000 g/mol. The polyester resin contains the above-mentioned range of an oligomer and thus prevents crystallization phenomenon due to precipitation of oligomers at a high temperature, and can maintain high transparency even after heat treatment.

Accordingly, it is expected that the polyester film can be suitably used for an optical film requiring high transparency, a film for a food container requiring excellent heat resistance and chemical resistance, a film for printing, an industrial and packaging film requiring improved heat sealability by controlling crystallinity.

Meanwhile, the polyester resin may have an intrinsic viscosity of 0.45 to 1.5 dl/g, 0.50 to 1.2 dl/g, 0.53 to 1.0 dl/g or 0.56 to 0.80 dl/g as measured at 35° C. after dissolving it in orthochlorophenol at a concentration of 1.2 g/dl at 150° C. for 15 minutes. If the intrinsic viscosity is less than the above range, defective appearance may occur due to a fast flowability during molding, sufficient mechanical strength may not be secured, and it may be difficult to exhibit a desired physical property by high drawing. Further, if the intrinsic viscosity exceeds the above range, the pressure of an extruder rises due to an increase in the viscosity of the melt during molding, and the co-extrusion step may not be performed smoothly. In addition, if the temperature of the extruder is raised in order to address the rise in pressure, the color and physical properties may be deteriorated due to heat distortion, and due to the difference in shrinkage with the substrate layer in the drawing and heat treatment process, problems in processes may occur.

Meanwhile, the polyester film may further comprise at least one additive selected from the group consisting of a UV screening agent, an antistatic agent, an impact modifier, an antioxidant, and fine particles. The method of adding the additives is not particularly limited. For example, a method such as adding the additives at the time of preparing the polyester resin, or preparing a high-concentration master batch of the additive, followed by dilution and mixing, etc. can be used.

Hereinafter, a method for preparing such polyester film will be described in detail.

The polyester film may be prepared by the method comprising the steps of:
(a) melt-extruding a polyester resin to prepare an undrawn polyester film comprising a resin layer formed from the polyester resin; and
(b) biaxially drawing the undrawn polyester film in the longitudinal and transverse directions at a temperature equal to or higher than the glass transition temperature of the polyester resin.

In the step (a), the polyester resin can be melt-extruded at a relatively low temperature to minimize thermal decomposition of the polymer and maintain the long-chain structure of the polymer. Specifically, the step (a) may be performed at a temperature of 240° C. to 310° C. or 250° C. to 300° C. If the melt extrusion temperature is less than 240° C., there is a problem that the polymer is not melted, and if the temperature is higher than 310° C., the thermal decomposition of the polymer is increased, and the film is damaged or broken during drawing of the film, so that it is difficult to realize the desired physical properties.

The undrawn polyester film obtained in the step (a) can be cooled to an appropriate temperature. Thereafter, the undrawn polyester film can be drawn at a temperature equal to or higher than the glass transition temperature of the polyester resin. Specifically, the drawing process of the undrawn polyester film can be carried out at a temperature of from 80° C. to 180° C. or 90° C. to 170° C. In the step (b), the undrawn polyester film can be drawn at a high magnification. Specifically, the undrawn polyester film can be biaxially drawn in the longitudinal direction draw ratio of 2 to 6.5 times and the traverse direction draw ratio of 2 to 7 times.

The method for preparing a polyester film may further comprise, after the step (b), (c) heat setting the polyester film obtained in the step (b). The step (c) may be performed at a temperature of 100° C. to 220° C.

Meanwhile, the polyester resin used in the step (a) has the above-mentioned content of isosorbide and diethylene glycol introduced therein, and is a polyester resin containing a low content of oligomer.

In order to prepare the polyester resin, the preparation method of the polyester film may comprise, before the step (a), (a0-1) carrying out an esterification reaction or a transesterification reaction of (i) a dicarboxylic acid or a derivative thereof, and (ii) a diol including 1 mol to 45 mol of isosorbide and 65 mol to 200 mol of ethylene glycol based on 100 mol of the total dicarboxylic acid or a derivative thereof; and (a0-2) subjecting the esterification reaction or transesterification reaction product to a polycondensation reaction so that an intrinsic viscosity, which is measured at 35° C. after dissolving it in orthochlorophenol at a concentration of 1.2 g/dl at 150° C. for 15 minutes, reaches 0.45 dl/g to 0.75 dl/g.

Herein, the polyester resin may be prepared in a batch process, a semi-continuous process or a continuous process, and the esterification reaction or transesterification reaction and the polycondensation reaction are preferably carried out under an inert gas atmosphere, the mixing of the polyester resin with other additives may be simple mixing or mixing by extrusion.

Meanwhile, the method may further include, after step (a0-2) and before step (a), (a0-3) crystallizing the polyester resin (hereinafter referred to as "polymer") prepared by polycondensation reaction, and (a0-4) subjecting the crystallized polymer to a solid phase polymerization such that the intrinsic viscosity, which is measured at 35° C. after dissolving the polymer in orthochlorophenol at a concentration of 1.2 g/dl at 150° C. for 15 minutes, reaches a value of 0.10 to 0.40 dl/g higher than the intrinsic viscosity of the polymer obtained in step (a0-2).

As used herein, the term "dicarboxylic acid or a derivative thereof" means at least one compound selected from dicarboxylic acid and a derivative of dicarboxylic acid. The term "derivative of dicarboxylic acid" means an alkyl ester of dicarboxylic acid (lower alkyl ester having 1 to 4 carbon atoms such as monomethyl, monoethyl, dimethyl, diethyl or dibutyl ester, etc.) or an anhydride of dicarboxylic acid. Thus, for example, the terephthalic acid or a derivative thereof is collectively referred to as terephthalic acid; monoalkyl or dialkyl terephthalate; and compounds of forming a terephthaloyl moiety by reaction with diols, such as terephthalic acid anhydride.

As the (i) dicarboxylic acid or a derivative thereof, terephthalic acid or a derivative thereof is mainly used. Specifically, terephthalic acid or a derivative thereof may be used alone as the (i) dicarboxylic acid or derivatives thereof. Further, the (i) dicarboxylic acid or a derivative thereof may be used in the form of a mixture of terephthalic acid or a derivative thereof; and at least one selected from the group consisting of an aromatic dicarboxylic acid having 8 to 14 carbon atoms or a derivative thereof and an aliphatic dicarboxylic acid having 4 to 12 carbon atoms or a derivative thereof, which is a dicarboxylic acid or a derivative thereof other than the terephthalic acid or a derivative thereof. The aromatic dicarboxylic acid having 8 to 14 carbon atoms or a derivative thereof may include an aromatic dicarboxylic acid or a derivative thereof commonly used in the preparation of polyester resins, for example, naphthalene dicarboxylic acid such as isophthalic acid, dimethyl isophthalate, phthalic acid, dimethyl phthalate, phthalic anhydride, 2,6-naphthalene dicarboxylic acid or the like, dialkyl naphthalene dicarboxylate such as dimethyl 2,6-naphthalene dicarboxylate, or the like, diphenyldicarboxylic acid, and the like. The aliphatic dicarboxylic acid having 4 to 12 carbon atoms or a derivative thereof may include a linear, branched or cyclic aliphatic dicarboxylic acid or a derivative thereof conventionally used in the preparation of polyester resins, for example, cyclohexanedicarboxylic acid such as 1,4-cyclohexanedicarboxylic acid, 1,3-cyclohexanedicarboxylic acid, or the like, cyclohexanedicarboxylate such as dimethyl 1,4-cyclohexanedicarboxylate, dimethyl 1,3-cyclohexanedicarboxylate or the like, sebacic acid, succinic acid, isodecyl succinic acid, maleic acid, maleic anhydride, fumaric acid, adipic acid, glutaric acid, azelaic acid, and the like.

The (i) dicarboxylic acid or a derivative thereof may include terephthalic acid or a derivative thereof in an amount of 50 mol % or more, 60 mol % or more, 70 mol % or more, 80 mol % or more, or 90 mol % or more based on the total (i) dicarboxylic acids or derivatives thereof. The (i) dicarboxylic acid or a derivative thereof may include a dicarboxylic acid or a derivative thereof other than terephthalic acid or a derivative thereof in an amount of 0 to 50 mol %, greater than 0 mol % and 50 mol % or less, or 0.1 to 40 mol % based on the total (i) dicarboxylic acids or derivatives thereof. Within such a content range, the polyester resin realizing appropriate physical properties can be prepared.

Meanwhile, the isosorbide (1,4:3,6-dianhydroglucitol) is used such that the diel moiety derived from isosorbide is 1 to 30 mol % based on the total diol moieties derived from the diol of the polyester resin prepared.

A part of isosorbide may be volatilized or not reacted during the synthesis of the polyester resin. Therefore, in order to introduce the above-mentioned content of isosorbide into the polyester resin, the isosorbide may be used in an amount of 1 mol to 45 mol based on 100 mol of the total dicarboxylic acids or derivatives thereof.

If the content of isosorbide exceeds the above range, a yellowing phenomenon may generate, and crystallinity may be significantly reduced, which may be disadvantageous for the drawing and heat setting steps. If the content is less than the above range, sufficient heat resistance, chemical resistance and mechanical strength may not be exhibited, and a haze may generate. However, the content of isosorbide can be adjusted within the above-mentioned range to provide a polyester film having excellent heat resistance, chemical resistance, heat sealability and transparency.

The content of the diol moiety derived from diethylene glycol introduced into the polyester resin is not directly proportional to the content of ethylene glycol used for the preparation of the polyester resin. However, ethylene glycol may be used in an amount of 65 mol to 200 mol based on 100 mol of the total dicarboxylic acids or derivatives thereof so that the diol moiety derived from diethylene glycol is 2 to 5 mol % based on the total diol moieties derived from the diol of the polyester resin.

If the content of the diol moiety derived from diethylene glycol introduced into the polyester resin exceeds the above range, it may not exhibit sufficient heat resistance, and if the content is less than the above range, a haze may generate.

The polyester resin may include 1 to 30 mol %, or 7 to 30 mol % or 12 to 30 mol % of a diol moiety derived from isosorbide, 2 to 5 mol % of a diol moiety derived from diethylene glycol and the remaining amount of a diol moiety derived from aliphatic diol, based on the total diol moieties.

The aliphatic diol may be an aliphatic diol having 2 to 12 carbon atoms. Specific examples of the aliphatic diol include a linear, branched or cyclic aliphatic diol such as ethylene glycol, diethylene glycol, triethylene glycol, propanediol (1,2-propanediol, 1,3-propanediol or the like), 1,4-butanediol, pentanediol, hexanediol (1,6-hexanediol, or the like), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol or the like. As the (ii) diol, the above-listed diols other than the isosorbide can be included alone or in combination of two or more thereof.

In the (ii) diol, the diol other than isosorbide may be ethylene glycol. Thus, the polyester resin may include 65 mol % or more, or 65 to 97 mol % of a diol moiety derived from ethylene glycol based on the total diol moieties. The content of other diols used for improving the physical properties in addition to isosorbide and ethylene glycol may be adjusted, for example, to 0 to 50 mol % or 0.1 to 30 mol %, based on the total (ii) diols.

Meanwhile, in order to prepare the polyester resin, the (i) dicarboxylic acid or a derivative thereof and (ii) the diol may be added to a reactor so that the molar ratio between the (i) dicarboxylic acid or a derivative thereof and the (ii) diol is 1.01 or more. In addition, the diol may be supplied to the reactor at one time before the polymerization reaction or may be added during the polymerization reaction several times, if necessary.

According to a more specific embodiment, the polyester resin satisfying a specific molecular weight distribution may be prepared by adjusting the initial input amount of the (i) dicarboxylic acid or a derivative thereof and the (ii) diol to a specific range in the initial stage of a reaction. Thereby, the polyester film of one embodiment and the polyester resin contained therein can be more effectively obtained.

In one example, when a dicarboxylic acid is used as the (i) dicarboxylic acid or a derivative thereof, the initial mixing molar ratio between the dicarboxylic acid or a derivative thereof and the (ii) diol may be adjusted to 1:1.01 to 1.05, and when a derivative such as a dicarboxylic acid alkyl ester or a dicarboxylic acid anhydride is used as the (i) dicarboxylic acid or a derivative thereof, the initial mixing molar ratio between the dicarboxylic acid and the diol may be adjusted to 1:2.0 to 1:2.1.

The initial mixing molar ratio may refer to a mixing molar ratio at the start of the polymerization reaction in the reactor, and a dicarboxylic acid or a derivative and/or a diol may be further added during the reaction if necessary.

Meanwhile, a catalyst may be used in the (a0-1) esterification reaction or transesterification reaction. Examples of the catalyst include a methylate of sodium and magnesium; an acetate, a borate, a fatty acid salt, a carbonate, and an alkoxy salt of Zn, Cd, Mn, Co, Ca, Ba, Ti or the like; metal Mg; an oxide of Pb, Zn, Sb, Ge, or the like.

The (a0-1) esterification reaction or the transesterification reaction may be carried out in a batch process, a semi-continuous process or a continuous process, and each raw material may be added separately, but it may be preferably added in the form of a slurry in which the dicarboxylic acid or a derivative thereof is mixed to the diol.

A polycondensation catalyst, a stabilizer, a coloring agent, a crystallizing agent, an antioxidant, a branching agent and the like may be added to the slurry before the start of the (a0-1) esterification reaction or the transesterification reaction, or to the product after the completion of the reaction.

However, the timing of adding the above-described additives is not limited thereto, and they may be added at any time point during the preparation of the polyester resin. As the polycondensation catalyst, at least one of conventional titanium-based catalyst, germanium-based catalyst, antimony-based catalyst, aluminum-based catalyst, tin-based catalyst, or the like may be appropriately selected and used. Examples of the useful titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide copolymer, titanium dioxide/zirconium dioxide copolymer or the like. Further, examples of the useful germanium-based catalyst include germanium dioxide and a copolymer thereof. The added amount of the polycondensation catalyst may be adjusted in the range of 1 ppm to 300 ppm relative to the weight of the final polymer (polyester resin) based on the central metal atom.

As the stabilizer, generally, a phosphor-based stabilizer such as phosphoric acid, trimethyl phosphate, triethyl phosphate, or the like may be used, and the added amount thereof may be in the range of 10 ppm to 5000 ppm relative to the weight of the final polymer (polyester resin) based on the phosphorus atom. If the added amount of the stabilizer is less than 10 ppm, the polyester resin may not be sufficiently stabilized and the color of the polymer may become yellow. If the added amount exceeds 5000 ppm, a desired polymer having a high degree of polymerization may not be obtained. Examples of the coloring agent added for improving the color of the polymer include a cobalt-based decoloring agent such as cobalt acetate, cobalt propionate or the like, and the added amount thereof is 1 to 300 ppm relative to the weight of the final polymer (polyester resin) based on the cobalt atom. If necessary, as an organic coloring agent, an anthraquionone-based compound, a perinone-based compound, an azo-based compound, a methine-based compound and the like may be used. Commercially available products include a toner such as Polysynthrene Blue RLS manufactured by Clarient or Solvaperm Red BB manufactured by Clarient. The added amount of the organic coloring agent may be adjusted in the range of 0 to 50 ppm relative to the weight of the final polymer. If the coloring agent is used in an amount outside the above range, the yellow color of the polyester resin may not be sufficiently concealed or the physical properties may be deteriorated.

Examples of the crystallizing agent include a crystal nucleating agent, a UV absorber, a polyolefin-based resin, a polyamide resin or the like. Examples of the antioxidant include a hindered phenol-based antioxidant, a phosphite-based antioxidant, a thioether-based antioxidant, or a mixture thereof. As the branching agent, for example, trimellitic anhydride, trimethylol propane, trimellitic acid or a mixture thereof may be used as a conventional branching agent having three or more functional groups.

The (a0-1) esterification reaction or the transesterification reaction may be carried out at a temperature of 150 to 300° C. or 200 to 270° C. under a pressure condition of 0 to 10.0 kgf/cm$^2$ (0 to 7355.6 mmHg), 0 to 5.0 kgf/cm$^2$ (0 to 3677.8 mmHg) or 0.1 to 3.0 kgf/cm$^2$ (73.6 to 2206.7 mmHg). Here, the pressure stated in the outside of the parenthesis refers to a gauge pressure (expressed in kgf/cm$^2$); and the pressure stated in the parenthesis refers to an absolute pressure (expressed in mmHg).

If the reaction temperature and pressure deviate from the above range, the physical properties of the polyester resin may be deteriorated. The reaction time (average retention time) is usually 1 to 24 hours or 2 to 8 hours, and may vary depending on the reaction temperature, the pressure, and the molar ratio of the diol relative to the dicarboxylic acid or a derivative thereof used.

The product obtained by the esterification reaction or the transesterification reaction may be prepared into a polyester resin having a higher degree of polymerization by polycondensation reaction. Generally, the polycondensation reaction is carried out at a temperature of 150 to 300° C., 200 to 290° C. or 250 to 290° C. under a reduced pressure of 0.01 to 400 mmHg, 0.05 to 100 mmHg or 0.1 to 10 mmHg. Herein, the pressure refers to the range of absolute pressures. The reduced pressure condition of 0.01 mmHg to 400 mmHg is used for removing glycol as a by-product of the polycondensation reaction, and isosorbide as an unreacted material, etc. Thus, if the reduced pressure condition deviates from the above range, the by-products and unreacted materials may not be sufficiently removed. Moreover, if the temperature of the polycondensation reaction deviates from the above range, the physical properties of the polyester resin may be deteriorated. The polycondensation reaction is carried out for a period of time required to reach a desirable intrinsic viscosity, for example, it may be carried out for an average retention time of 1 hours to 24 hours.

For the purpose of reducing the content of unreacted materials such as isosorbide remaining in the polyester resin, it is possible to intentionally keep the vacuum reaction long at the last stage of the esterification reaction or transesterification reaction or at the initial stage of the polycondensation reaction, that is, at a state in which the viscosity of the resin is not sufficiently high, thereby discharging the unreacted raw materials out of the system. When the viscosity of the resin is increased, it may be difficult for raw materials remaining in the reactor to escape out of the system. In one example, before the polycondensation reaction, the reaction product obtained by the esterification reaction or the transesterification reaction is allowed to stand at a reduced pressure condition of about 400 to 1 mmHg or about 200 to 3 mmHg for 0.2 to 3 hours to effectively remove unreacted materials such as isosorbide remaining in the polyester resin. Herein, the temperature of the product may be controlled to a temperature equal to the temperature of the esterification reaction or transesterification reaction and of the polycondensation reaction, or to a temperature therebetween.

As the process of flowing out the unreacted raw materials through the control of the vacuum reaction is further added, the amount of unreacted materials such as isosorbide remaining in the polyester resin can be reduced, and consequently, the polyester film satisfying the physical properties of one embodiment and the polyester resin included therein can be more effectively obtained.

Meanwhile, the intrinsic viscosity of the polymer after the polycondensation reaction is appropriately in the range of 0.45 dl/g to 0.75 dl/g. If the intrinsic viscosity is less than 0.45 dl/g, the reaction speed in the solid phase polymerization reaction is significantly reduced. If the intrinsic viscosity exceeds 0.75 dl/g, as the viscosity of the melt increases during the melt polymerization, the possibility of discoloration of the polymer is increased due to the shear stress between the stirrer and the reactor, and side reaction materials such as acetaldehyde are also increased. Meanwhile, when the polycondensation reaction is carried out so as to have a high intrinsic viscosity, which is then introduced into the solid phase polymerization stage, a polyester resin having a uniform molecular weight distribution can be obtained, thereby further improving the chemical resistance and transparency.

A polyester resin capable of forming the polyester film according to one embodiment can be produced through the steps (a0-1) and (a0-2). In addition, if necessary, a solid phase polymerization reaction may proceed in succession. Specifically, the method for preparing the polyester film according to one embodiment of the present invention may further include, after step (a0-2), (a0-3) crystallizing the polymer prepared by polycondensation reaction; and (a0-4) subjecting the crystallized polymer to a solid phase polymerization such that the intrinsic viscosity, which is measured at 35° C. after dissolving the polymer in orthochlorophenol at a concentration of 1.2 g/dl at 150° C. for 15 minutes, reaches a value of 0.10 to 0.40 dl/g higher than the intrinsic viscosity of the resin obtained in step (b).

Specifically, in the crystallization step (a0-3), the polymer obtained by the polycondensation reaction (a0-2) is discharged out of the reactor to be granulated. As the granulation method, a strand cutting method of extruding into a strand type, solidifying in a cooling liquid and then cutting with a cutter, or an underwater cutting method of immersing a die hole in a cooling liquid, directly extruding in a cooling liquid and then cutting with a cutter can be used. Generally, in the strand cutting method, the cooling liquid is maintained at a low temperature and strand should be sufficiently solidified, thereby preventing cutting problems. In the underwater cutting method, it is preferred that the temperature of the cooling liquid is maintained in accordance with the polymer so that the shape of the polymer becomes uniform. However, in the case of a crystalline polymer, the temperature of the cooling liquid may be intentionally maintained at a high level in order to induce crystallization during discharge.

Meanwhile, it is also possible to additionally wash the granulated polymer with water. The temperature of water during washing is preferably equal to or lower by about 5 to 20° C. than the glass transition temperature of the polymer, and fusion may occur at a higher temperature, which is not preferable. In the case of polymer particles that induce the crystallization during discharge, fusion does not occur at a temperature higher than the glass transition temperature, and thus, the temperature of water may be set according to the degree of crystallization. Through washing of the granulated polymer, the raw materials dissolved in water among the unreacted raw materials can be removed. As the particle size decreases, the surface area relative to the weight of the particles increases, and thus, a smaller particle size is preferred. In order to achieve such purpose, the particles may be prepared to have an average weight of about 14 mg or less.

The granulated polymer undergoes the crystallization step to prevent fusion during the solid phase polymerization. The crystallization may be carried out under the atmosphere, inert gas, water vapor, vapor-containing inert gas atmosphere or in a solution at 110° C. to 180° C. or 120° C. to 180° C. If the temperature is low, the rate at which the crystals of the particles are formed is too slow. If the temperature is high, the surface of the particles are melted at a faster rate than the rate at which the crystals are formed, making the particles to stick together, thereby causing fusion. Since the heat resistance of the particles increases as the particles are crystallized, it is also possible to carry out the crystallization by dividing it into several steps and raising the temperature stepwise.

The solid phase polymerization reaction may be carried out under an inert gas atmosphere such as nitrogen, carbon dioxide, argon or the like, or under a reduced pressure condition of 400 to 0.01 mmHg at a temperature of 180° C. to 220° C. for an average retention time of 1 hour or more, preferably 10 hours or more. Through such solid phase polymerization, the molecular weight is further increased, and the raw materials, which remain unreacted in the melting reaction, and cyclic oligomers, acetaldehydes and the like generated during the reaction may be removed.

In order to provide the polyester film according to one embodiment, the solid phase polymerization may be carried out until the intrinsic viscosity reaches a value of 0.10 dl/g to 0.40 dl/g higher than the intrinsic viscosity of the polymer obtained in the polycondensation reaction step (a0-2). If the difference between the intrinsic viscosity of the resin after the solid phase polymerization reaction and the intrinsic viscosity of the resin before the solid phase polymerization is less than 0.10 dl/g, an effect of sufficiently improving the degree of polymerization cannot be obtained. If the difference between the intrinsic viscosity of the resin after the solid phase polymerization and the intrinsic viscosity of the resin before the solid phase polymerization exceeds 0.40 dl/g, the molecular weight distribution becomes wide and so a sufficient heat resistance cannot be exhibited, and further the content of the oligomer is relatively increased and so the possibility of crystallization at a high temperature is increased and it becomes difficult to maintain high transparency after heat treatment.

The solid phase polymerization is carried out in such a manner that the intrinsic viscosity of the resin is 0.10 to 0.40 dl/g higher than the intrinsic viscosity of the resin before the solid phase polymerization, and until the intrinsic viscosity reaches a value of 0.65 to 1.5 dl/g, 0.7 to 1.2 dl/g, or 0.8 to 1.0 dl/g. When the solid phase polymerization is proceeded until it reaches the intrinsic viscosity within such range, the molecular weight distribution of the polymer becomes narrower, thereby decreasing the crystallization rate during molding. Accordingly, the heat resistance and the degree of crystallinity can be improved without deteriorating the transparency. If the intrinsic viscosity of the resin after the solid phase polymerization reaction is less than the above range, it may be difficult to provide a polyester film having excellent transparency due to an increase in the crystallization rate by the polymer having a low molecular weight.

The polyester resin prepared by the above method has an alternating structure of an acid moiety derived from a dicarboxylic acid or a derivative thereof and a diol moiety derived from a diol. In the specification, the acid moiety and the diol moiety refer to a residue remaining after the dicarboxylic acid or a derivative thereof and the diol are polymerized and hydrogen, hydroxyl or alkoxy groups are removed therefrom.

In particular, the polyester resin is prepared according to the method described above, and can contain 1 to 30 mol % of the diol moiety derived from isosorbide and 2 to 5 mol % of the diol moiety derived from diethylene glycol based on the total diol moieties, and further 1.3 wt % or less of oligomers. Accordingly, the polyester film formed from the polyester resin exhibits excellent heat resistance, chemical resistance, and heat sealability as described above, and can exhibit improved mechanical properties and transparency.

The polyester resin may have a number average molecular weight (Mn) of about 12,000 to 50,000 g/mol or about 15,000 to 40,000 g/mol. The polyester resin may have a weight average molecular weight (Mw) of about 45,000 to 250,000 g/mol or about 50,000 to 225,000 g/mol. Further, the molecular weight distribution (PDI) of the polyester resin may be in the range of 2.5 to 4.5 or 2.8 to 4.0. If the weight average molecular weight is less than the above range, the mechanical properties, for example, tensile strength or the like may be deteriorated. If the weight average molecular weight exceeds the above range, processability may be deteriorated as the melting point increases, and the process may not be performed smoothly due to an increase in pressure during melt extrusion.

The polyester resin may have a glass transition temperature (Tg) of about 82° C. to 110° C. Within such a range, it is possible to provide a polyester film ng excellent various physical properties without a yellowing phenomenon.

The polyester resin may or may not have a crystallization temperature (Tc) and a melting point (Tm) in accordance with the measurement condition of differential scanning calorimetry (DSC). The polyester resin having a glass transition temperature (Tg) ranging from 82° C. to 110° C. may have a crystallization temperature (Tc) of about 120° C. to 200° C. or about 130° C. to 190° C. In the polyester resin having a glass transition temperature (Tg) of 90° C. to 110° C. or 92° C. to 110° C., the crystallization temperature (Tc) is not measured, or it may be in the range of about 130° C. to 190° C. or about 140° C. to 180° C. Within the range, the polyester resin has an appropriate crystallization rate and thus can enable the solid phase polymerization reaction and exhibit high transparency after molding.

The polyester film according to one embodiment of the present invention exhibits high transparency. Specifically, when the thickness of the polyester film is 20 μm, the haze measured according to ASTM D1003-97 may be 2% or less, 1.5% or less, or 1.2% or less. The lower limit of the haze value is not particularly limited and may be 0%.

In addition, the polyester film can maintain high transparency even after heat treatment. Thus, a haze variation after heat treatment of the polyester film at 150° C. for 1 hour (haze variation (%)=haze (%) after heat treatment−haze (%) before heat treatment) may be 2% or less, 1% or less, 0.8% or less, or 0.5% or less. It is preferable that the haze variation is theoretically 0%, and thus the lower limit of the haze variation may be 0%.

The polyester film may be a single layer film comprising a resin layer formed from the polyester resin or may further comprise a substrate layer, and may be a multilayer film in which a resin layer formed from the polyester resin is laminated on at least one side of the substrate layer.

Since the single-layer film can be produced through the steps (a) and (b) using the above-mentioned polyester resin, the details thereof will be omitted here.

In the multilayer film, the substrate layer may include a thermoplastic resin. As the thermoplastic resin, polyethylene terephthalate (PET) obtained by the polycondensation of terephthalic acid and ethylene glycol; or a PET-based copolymerized polyester resin in which a part of terephthalic acid is replaced by another dicarboxylic acid or a part of ethylene glycol is changed to another diol can be used. In particular, examples of another diol replacing a part of the ethylene glycol include neopentyl glycol, 1,4-cyclohexanedimethanol, propylene glycol, tetramethylene glycol, and the like.

In order to produce such a multilayer film, in the above-mentioned step (a), the thermoplastic resin and the polyester resin may be simultaneously or sequentially melt-extruded. As a result, it is possible to produce an undrawn polyester film including a substrate layer formed of the thermoplastic resin, and a resin layer formed from the polyester resin which is laminated on at least one side of the substrate layer. The step (a) may be carried out under the above-described conditions, except that the thermoplastic resin is additionally used in the step (a).

The multilayer film may include at least one of the substrate layer and the resin layer, respectively.

Specifically, the multilayer film may have a structure in which a resin layer is laminated on one side of a substrate layer; or a resin layer is laminated on both sides of the substrate layer; or a resin layer is interposed between two or more substrate layers; or a resin layer is disposed between two or more substrate layers and on a surface of the substrate layer.

In the multilayered film, the ratio of the thickness of the resin layer to the thickness of the substrate layer (the thickness of the resin layer/the thickness of the substrate layer×100) may be 5% to 75%. Further, the total thickness of the polyester film is 3 μm to 350 μm, and the thickness of the resin layer can be adjusted so that the ratio of the thickness of the resin layer to the thickness of the polyester film (the thickness of the resin layer/the thickness of the polyester film×100) is 1% to 50%. The thicknesses of the substrate layer and the resin layer can be appropriately determined depending on the physical properties and applications of the polyester film.

The resin layer of the polyester film has a heat resistance of 82° C. to 120° C. and thus can be used in a printing process applied at a temperature of around 80° C. In addition, it can exhibit excellent resistance to a solvent used for printing, such as methyl ethyl ketone or toluene, and also can exhibit good physical properties even after printing.

In order to improve the heat sealability of the polyester film, it is desirable to have low crystallinity, and the seal seam strength (measured at 130° C., 2 bar, 0.5 sec) is at least 1.0 N/15 mm, preferably 1.5 N/15 mm, more preferably 2.0 N/15 mm of the film width.

As described above, the polyester film according to one embodiment of the present invention exhibits excellent heat resistance, chemical resistance and heat sealability and also have improved mechanical strength and transparency. Accordingly, the polyester film can be used in various applications, particularly, it is expected to be useful for an optical film requiring high transparency, a film for a food container requiring high heat resistance and chemical resistance, a film for printing. In addition, it is expected to be useful for an industrial and packaging film due to the above-mentioned excellent heat sealability.

Hereinafter, the action and effect of the present invention will be described by way of specific Examples. However, these Examples are given for illustrative purposes only, and they are not intended to limit the scope of the invention in any manner.

The following physical properties were measured according to the methods below.

(1) Intrinsic Viscosity (IV):

The intrinsic viscosity of the specimen was measured using a Ubbelohde viscometer after dissolving the specimen in o-chlorophenol at a concentration of 1.2 g/dl at 150° C. for 15 minutes. Specifically, the temperature of the viscometer was maintained at 35° C., and the time (efflux time) to required for a solvent to pass between the specific internal sections of the viscometer and the time t required for a solution to pass therebetween were determined. Thereafter, the value of to and the value of t were substituted into Equation 1 to calculate a specific viscosity, and the calculated specific viscosity value was substituted into Equation 2 to calculate an intrinsic viscosity.

$$\eta_{sp} = \frac{t - t_0}{t_0}$$ [Equation 1]

$$[\eta] = \frac{\sqrt{1 + 4A\eta_{sp}} - 1}{2Ac}$$ [Equation 2]

in Equation 2, A represents the Huggins constant, in which a value of 0.247 was used, and c represents a concentration value, in which a value of 1.2 g/dl was used.

(2) Glass Transition Temperature (Tg):

Tg of the polyester resins prepared in Examples and Comparative Examples was measured by DSC (differential scanning calorimetry). DSC 1 model manufactured by Mettler Toledo was used as the measuring device. Specifically, the polyester resin sample used for the analysis was dried for 5 to 10 hours under a nitrogen atmosphere at 120° C. using a dehumidifying dryer (model name: D2T manufactured by Moretto). Thus, the Tg was measured in a state in which the amount of water remaining in the sample was less than 500 ppm. About 6 to 10 mg of the dried sample was taken and filled into an aluminum pan. Then, the sample was heated from room temperature to 280° C. at a rate of 10° C./min (first scan) and annealed at 280° C. for 3 minutes. After the sample was rapidly cooled to room temperature, the sample was again heated from room temperature to 280° C. at a rate of 10° C./min to obtain a DSC curve (second scan). Then, the Tg value in the DSC second scan was analyzed through the glass transition function in the DSC menu of the related program (STARe Software) provided by Mettler Toledo. Herein, the Tg is defined as the temperature at which the maximum slope of the curve appears at the point where the DSC curve obtained during the second scan changes to a stair shape for the first time during the temperature rising process. The temperature range of the scan was set from −20° C.~15° C. to 15° C.~20° C. of the midpoint calculated from the program.

(3) Oligomer Content 0.3 g of the polyester resins prepared in Examples and Comparative Examples were placed in 15 of o-chlorophenol and dissolved at 150° C. for 15 minutes. After cooling to room temperature, 9 mL of chloroform was added thereto. Gel permeation chromatography was then performed using a column (available from Tosoh Corp.) and a RI detector. The ratio of the molecular weight area of 500 to 1000 g/mol to the total molecular weight area was calculated via the graph of the molecular weight of the polyester resin thus obtained, and was defined by the oligomer content of the polyester resin.

(4) Thickness

The cross sections of the polyester films produced in Examples and Comparative Examples were observed with an optical microscope, and the thickness of the substrate layer, the thickness of the resin layer, the total thickness of the substrate layer and the resin layer were determined several times to obtain the average value.

(5) Transmittance and Haze

The polyester films produced in Examples and Comparative Examples were cut to a size of 10 cm×10 cm (longitudinal length×transverse length) to prepare specimens. The parallel transmittance and the diffuse transmittance of the specimens were measured in accordance with Test Method ASTM D 1003-97 using Minolta CM-3600A spectrophotometer. The transmittance is defined by the sum of the parallel transmittance and the diffuse transmittance, and the haze is defined by the ratio of the diffuse transmittance to the transmittance (haze=diffuse transmittance/transmittance× 100). Therefore, the transmittance (initial transmittance) and haze (initial haze, haze before heat treatment) were determined from the parallel transmittance and the diffuse transmittance of the specimen.

The specimens were kept in an oven at 150° C. for 1 hour and then heat-treated. The haze (haze after heat treatment) of the specimen was again measured in the same manner as in the method of measuring the initial haze. The haze value before and after the heat treatment was substituted into the following Equation 3 to calculate the haze variation.

Haze variation (%)=haze (%) after heat treatment− haze (%) before heat treatment [Equation 3]

(6) Seal Seam Strength

In order to measure the seal seam strength of the polyester films produced in Examples and Comparative Examples, a film strip having a width of 15 mm was prepared. Then, a film strip was placed on a general crystalline PET tray, and the specimen was prepared by proceeding at a seal temperature of 130° C., a pressure of 2 bar, and an exposure time of 0.5 seconds. The seal seam strength was measured according to a T-Peel test method.

(7) Chemical Resistance

A 15 mm specimen was prepared and immersed in a methyl ethyl ketone solvent or a toluene solvent at room temperature for 12 hours. The tensile strength was then measured using Instron UTM (Universal Testing Machine). The ratio of the tensile strength after immersion to the tensile strength before immersion (initial tensile strength) (tensile strength after immersion/initial tensile strength×100) was determined to evaluate the chemical resistance to methyl ethyl ketone or toluene.

⊚: Tensile strength retention of 70% or more
○: Tensile strength retention of 50% or more
ΔA: Tensile strength retention of 30% or more (8) Heat Resistance In order to measure the heat resistance of the polyester films produced in Examples and Comparative Examples, a specimen having a longitudinal length of 15 mm was prepared. The temperature of the inflection point at which the film was shrunk in the longitudinal direction was measured by raising the temperature from 30° C. to 200° C. at a rate of 10° C./min in the state where external stress was applied using TMA (TA Instruments Inc.).

⊚: inflection point temperature of 82° C. or higher
○: Inflection point temperature of 78° C. or higher
X: inflection point temperature of lower than 78° C.

Example 1: Preparation of Polyester Resin and Polyester Film (1) Preparation of Polyester Resin 2463 g (14.8 mol) of terephthalic acid, 828 g (13.3 mol) of ethylene glycol, 8 g (0.1 mol) of diethylene glycol and 325 g (1.9 mol) of isosorbide were added to a 10 L reactor equipped with a column and a water-cooled condenser, wherein the content was adjusted so that the diol moiety derived from isosorbide introduced into the final polyester resin was 10 mol % based on the entire diol moiety, and $GeO_2$ as a catalyst, phosphoric acid as a stabilizer, and cobalt acetate as a coloring agent were used. Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised up to 280° C. for 1 hour, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.61 dl/g. When the intrinsic viscosity of the mixture in the reactor reached a desired level, the mixture was discharged to the outside of the reactor and stranded, then it was solidified with a cooling liquid and granulated so that the average weight was about 12 to 14 mg.

(2) Preparation of Polyester Film

The polyester resin prepared above was added to an extruder and melted at a temperature of 250° C. to 300° C.

Then, the polyester resin was extruded through a die to prepare an undrawn polyester sheet. Next, the undrawn polyester sheet was drawn ire the longitudinal direction at a draw ratio of 2.0 times, drawn in the transverse direction at a draw ratio of 2.0 times, subjected to heat setting, and wound to prepare polyester film having a thickness of 20 μm.

Example 2: Preparation of Polyester Resin and Polyester Film (1) Preparation of Polyester Resin 2463 g (14.8 mol) of terephthalic acid, 828 g (13.3 mol) of ethylene glycol, 16 g (0.3 mol) of diethylene glycol and 325 g (1.9 mol) of isosorbide were added to a 10 L reactor equipped with a column and a water-cooled condenser, wherein the content was adjusted so that the diol moiety derived from isosorbide introduced into the final polyester resin was 10 mol % based on the entire diol moiety, and $GeO_2$ as a catalyst, phosphoric acid as a stabilizer, and cobalt acetate as a coloring agent were used. Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised up to 280° C. for 1 hour, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.61 dl/g. When the intrinsic viscosity of the mixture in the reactor reached a desired level, the mixture was discharged to the outside of the reactor and stranded, then it was solidified with a cooling liquid and granulated so that the average weight was about 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised up to 200° C. at a rate of 40° C./hour and maintained at 200° C. The solid phase polymerization was carried out until the intrinsic viscosity (IV) of the particles in the reactor reached 0.75 dl/g.

(2) Preparation of Polyester Film

The polyester resin prepared above was added to a multilayer extruder and melted at a temperature of 250° C. to 300° C.

Then, the PET and the polyester resin were co-extruded through a multilayer die to prepare an undrawn polyester sheet in which a resin layer formed from the polyester resin is laminated on one side of the substrate layer formed form PET. Next, the undrawn polyester sheet was drawn in the longitudinal direction at a draw ratio of 2.8 times, drawn in the transverse direction at a draw ratio of 3.0 times, subjected to heat setting, and wound to prepare polyester film having a thickness of 20 μm.

Example 3: Preparation of Polyester Resin and Polyester Film (1) Preparation of Polyester Resin 2423 g (14.6 mol) of terephthalic acid, 801 g (12.9 mol) of ethylene glycol, 23 g (0.2 mol) of diethylene glycol and 320 g (2.2 mol) of isosorbide were added to a 10 L reactor equipped with a column and a water-cooled condenser, wherein the content was adjusted so that the diol moiety derived from isosorbide introduced into the final polyester resin was 10 mol % based on the entire diol moiety, and $GeO_2$ as a catalyst, phosphoric acid as a stabilizer, and cobalt acetate as a coloring agent were used. Then, nitrogen was injected into the reactor to create a pressurized state in which the pressure of the reactor was higher than the atmospheric pressure by 1.0 kgf/cm$^2$ (absolute pressure: 1495.6 mmHg).

Then, the temperature of the reactor was raised to 220° C. for 90 minutes, maintained at 220° C. for 2 hours, and then raised up to 260° C. for 2 hours. Thereafter, the mixture in the reactor was observed with the naked eye, and the esterification reaction was carried out while maintaining the temperature of the reactor at 260° C. until the mixture became transparent. During this process, after confirming that 650 g of by-products were discharged through the column and the condenser, 226 g (3.6 mol) of ethylene glycol was further added to the reactor. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised up to 280° C. for 1 hour, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.61 dl/g. When the intrinsic viscosity of the mixture in the reactor reached a desired level, the mixture was discharged to the outside of the reactor and stranded, then it was solidified with a cooling liquid and granulated so that the average weight was about 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised up to 200° C. at a rate of 40° C./hour and maintained at 200° C. The solid phase polymerization was carried out until the intrinsic viscosity (IV) of the particles in the reactor reached 0.73 dl/g.

(2) Preparation of Polyester Film

The polyester resin prepared above was added to a multilayer extruder and melted at a temperature of 250° C. to 300° C.

Then, the PET and the polyester resin were co-extruded through a multilayer die to prepare an undrawn polyester sheet in which a resin layer formed from the polyester resin is laminated on one side of the substrate layer formed form PET. Next, the undrawn polyester sheet was drawn in the longitudinal direction at a draw ratio of 2.8 times, drawn in the transverse direction at a draw ratio of 3.0 times, subjected to heat setting, and wound to prepare a polyester film having a thickness of 20 μm.

Comparative Example 1: Preparation of Polyester Resin and Polyester Film

A polyester film having a thickness of 20 μm was prepared in the same manner as in Example 2, except that PET resin was used as a polyester resin.

Examples 4 & 5 and Comparative Examples 2 to 4: Preparation of Polyester Resin and Polyester Film First, in Example 4 and Comparative Example 3, the initial input molar ratio of the dicarboxylic acid or a derivative thereof and the diol was controlled in the same manner as in Example 1, and in Example 5 and Comparative Examples 2 & 4, the initial input molar ratio of the dicarboxylic acid or derivative and the diol was controlled in the same manner as in Example 2.

In addition, by controlling the total input amount (input molar number) of ethylene glycol, isosorbide and diethylene glycol, the content of the diol moieties derived from isosorbide introduced into the polyester resin and the content of the diol moieties derived from diethylene glycol was controlled as shown in Table 1 below. The polyester resins and polyester films were prepared in the same manner as in Example 2, except that the other desired intrinsic viscosity value, the thickness of the polyester film and the thickness of the resin layer were adjusted as shown in Table 1.

Experimental Example: Evaluation of Polyester Films

The physical properties of the polyester resins prepared in Examples 1 to 5 and Comparative Examples 1 to 4 were evaluated according to the methods described above, and the results are shown in Table 1.

TABLE 1

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| ISB content [mol %] | 10 | 10 | 14 | 7 | 30 | 0 | 14 | 7 | 40 |

TABLE 1-continued

|  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| DEG content [mol %] | 3.0 | 4.1 | 3.8 | 4.2 | 4.3 | 4.0 | 4.1 | 8.2 | 3.9 |
| IV [dl/g] | 0.6 | 0.72 | 0.73 | 0.75 | 0.75 | 0.78 | 0.35 | 0.75 | 0.75 |
| Tg [° C.] | 91 | 91 | 94 | 85 | 110 | 78 | 94 | 81 | 123 |
| Oligomer content [wt %] | 0.7 | 0.6 | 0.8 | 1.0 | 0.9 | 1.5 | 0.9 | 1.3 | 1.0 |

ISB content: The molar ratio of the residue derived from isosorbide relative to the residue derived from total diols included in the polyester resin
DEG content: The molar ratio of the residue derived from diethylene glycol relative to the residue derived from total diols included in the polyester resin
IV: Intrinsic viscosity of the polyester resin
Tg: Glass transition temperature of the polyester resin Next, the physical properties of the polyester films produced in Examples 1 to 5 and Comparative Examples 1 to 4 were evaluated according to the methods described above, and the results are shown in Table 2 below.

On the other hand, the polyester film of Example 2 shows that a low haze value was maintained even after heat treatment, and when exposed to the solvent, the tensile strength was good and the seal seam strength was excellent.

TABLE 2

|  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Substrate layer | — | PET | PET | PET | PET | PET | PET | PET | PET |
| Film thickness (μm) | 20 | 20 | 15 | 20 | 20 | 20 | 20 | 20 | 20 |
| Resin layer thickness (μm) | 20 | 2 | 3 | 2 | 2 | 2 | 2 | 2 | 2 |
| Draw ratio (longitudinal direction × transverse direction) | 2.0 × 2.0 | 2.8 × 3.0 | 2.8 × 3.0 | 2.8 × 3.0 | 2.8 × 3.0 | 2.8 × 3.0 | 2.8 × 3.0 | 2.8 × 3.0 | 2.8 × 3.0 |
| Transmittance (%) | 91 | 91 | 91 | 90 | 92 | 90 | 91 | 90 | — |
| Initial haze (%) | 1.1 | 1.1 | 1.2 | 1.8 | 1.2 | 1.0 | 1.1 | 1.1 | — |
| Haze after heat treatment (%) | 1.5 | 1.4 | 1.6 | 2.6 | 1.8 | 4.8 | 1.6 | 5.3 | — |
| Haze variation (%) | 0.4 | 0.3 | 0.4 | 0.8 | 0.6 | 3.8 | 0.5 | 4.2 | — |
| Seal seam strength (d/g) | 1.9 | 1.8 | 2.3 | 1.6 | 2.6 | 0.7 | 1.7 | 0.8 | — |
| Heat resistance | ○ | ○ | ⊚ | ○ | ⊚ | X | X | X | — |
| Chemical resistance (methyl ethyl ketone) | ⊚ | ⊚ | ⊚ | ○ | ⊚ | Δ | Δ | Δ | — |
| Chemical resistance (toluene) | Δ | Δ | Δ | Δ | Δ | X | X | X | — |

Film thickness: the thickness of the polyester film, which is the total thickness of the substrate layer and the resin layer Referring to Table 1 and Table 2, it is confirmed that the polyester films of Example 1 and Comparative Example 1 had different physical properties depending on the type of resin at the same film thickness. It is confirmed that in Comparative Example 1, the seal seam strength and heat resistance were very poor, but the polyester film of Example 1 had good seal seam strength and heat resistance.

It is confirmed that the polyester films of Example 2 and Comparative Example 1 had the same thicknesses of the substrate layer and the resin layer but exhibited different physical properties depending on the kind of the polyester resin constituting the resin layer. Specifically, the polyester film of Comparative Example 1 shows that the initial haze value was low, but the haze value greatly increased after heat treatment, and when exposed to the solvent, physical properties changed abruptly and the seal seam strength was low.

The resin layers of Example 3 and Comparative Example 2 are formed from the polyester resins having different intrinsic viscosity although the same content of isosorbide was introduced. As a result, it is confirmed that the seal seam strength, the heat resistance and the chemical resistance varied depending on the intrinsic viscosity of the polyester resin.

The resin layers of Example 4 and Comparative Example 3 were formed of a polyester resin into which the same content of isosorbide is introduced, whereas the resin layer of Comparative Example 3 is formed of a polyester resin into which a large amount of diethylene glycol is introduced, and thus, the haze value after heat treatment greatly increased, and poor mechanical properties, heat resistance, and chemical resistance were exhibited.

In the polyester films of Example 5 and Comparative Example 4, the thicknesses of the substrate layer and the resin layer are the same but there are a difference in the content of isosorbide introduced into the polyester resin constituting the resin layer. As the resin layer of Comparative Example 4 is formed of a polyester resin into which more than 30 mol % of isosorbide is introduced, the polyester film of Comparative Example 4 did not cause orientation by drawing. Thus, in Comparative Example 4, a biaxially drawn polyester film could not be produced, and the physical properties described in Experimental Example above could not be evaluated.

Accordingly, when the resin layer introduces a specific amount of isosorbide and diethylene glycol, includes a specific amount of oligomer and is formed from a polyester resin exhibiting a specific intrinsic viscosity, it can exhibit excellent mechanical properties, heat resistance, chemical resistance and good heat sealability. In addition, the polyester film containing the resin layer can maintain high transparency even after heat treatment.

Accordingly, the polyester film according to one embodiment of the present invention is expected to be useful for various applications such as an industrial film, a film for food container, a packaging film, an optical film, an insulating film, and a printing film.

What is claimed is:

1. A polyester film comprising a resin layer formed from a polyester resin which has an alternating structure of an acid moiety derived from a dicarboxylic acid and a diol moiety derived from a diol, which contains 1 to 30 mol % of a diol moiety derived from isosorbide, 2 to 5 mol % of a diol moiety derived from diethylene glycol, and 65 mol % or more of a diol moiety derived from ethylene glycol based on the total diol moieties derived from the diol, and which has an oligomer content with a molecular weight ranging from 500 to 1000 g/mol of 1.3% by weight or less based on the total weight of the polyester resin,
   wherein the polyester resin has an intrinsic viscosity of 0.45 to 1.5 dl/g as measured at 35° C. after dissolving it in ortho-chlorophenol at a concentration of 1.2 g/dl at 150° C. for 15 minutes and a molecular weight distribution from 2.8 to 4.0,
   wherein the polyester film is a polyester film biaxially drawn in the longitudinal and transverse directions, and
   wherein a haze measured according to ASTM D1003-97 is 2% or less when the thickness of the polyester film is 20 μm, and a haze variation after heat treatment of the polyester film at 150° C. for 1 hour (haze variation (%)=haze (%) after heat treatment−haze (%) before heat treatment) is 2% or less.

2. The polyester film of claim 1, wherein the dicarboxylic acid comprises terephthalic acid.

3. The polyester film of claim 2, wherein the dicarboxylic acid comprises a dicarboxylic acid other than terephthalic acid selected from the group consisting of an aromatic dicarboxylic acid having 8 to 14 carbon atoms, an aliphatic dicarboxylic acid having 4 to 12 carbon atoms, and combinations thereof in an amount of 0 to 50 mol % based on the total dicarboxylic acid moieties.

4. The polyester film of claim 1, wherein the polyester resin has a number average molecular weight of about 12,000 to 50,000 g/mol.

5. The polyester film of claim 1, wherein the polyester resin has a weight average molecular weight of 45,000 to 250,000 g/mol.

6. The polyester film of claim 1, wherein the polyester resin has a glass transition temperature of 82° C. to 110° C.

7. The polyester film of claim 1, wherein the polyester resin contains 1 ppm to 300 ppm of a polycondensation catalyst, 10 ppm to 5000 ppm of a phosphor-based stabilizer or 1 ppm to 300 ppm of a cobalt-based coloring agent, based on the central metal atom.

8. The polyester film of claim 1, wherein the polyester resin further includes at least one additive selected from the group consisting of a UV screening agent, an antistatic agent, an impact modifier, an antioxidant, and fine particles.

9. The polyester film of claim 1, wherein the polyester film is biaxially drawn in a longitudinal direction draw ratio of 2 to 6.5 times and a traverse direction draw ratio of 2 to 7 times.

10. The polyester film of claim 1, comprising the resin layer.

11. The polyester film of claim 1, further comprising a substrate layer containing a thermoplastic resin, in which the resin layer is formed on at least one side of the substrate layer.

12. The polyester film of claim 11, wherein the thermoplastic resin is polyethylene terephthalate.

13. The polyester film of claim 11, comprising at least one of the substrate layer and the resin layer, respectively.

14. The polyester film of claim 1, wherein a ratio of the thickness of the resin layer to the thickness of the substrate layer (the thickness of the resin layer/the thickness of the substrate layer×100) is 5% to 75%.

15. The polyester film of claim 1, wherein the polyester film is used as an industrial film, a film for food container, a packaging film, an optical film, an insulating film, or a printing film.

16. A method for preparing the polyester film of claim 1 comprising the steps of:
   (a) melt-extruding a polyester resin to prepare an undrawn polyester film comprising a resin layer formed from the polyester resin; and
   (b) biaxially drawing the undrawn polyester film in the longitudinal and transverse directions at a temperature equal to or higher than the glass transition temperature of the polyester resin.

17. The method for preparing the polyester film of claim 16, wherein the step (a) is performed at a temperature of 240° C. to 310° C.

18. The method for preparing the polyester film of claim 16, wherein the step (b) is performed at a temperature of 80° C. to 180° C.

19. The method for preparing the polyester film of claim 16, wherein in the step (b), the undrawn polyester film is biaxially drawn in a longitudinal direction draw ratio of 2 to 6.5 times and a traverse direction draw ratio of 2 to 7 times.

20. The method for preparing the polyester film of claim 16, further comprising, after the step (b), (c) heat setting the polyester film obtained in the step (b).

21. The method for preparing the polyester film of claim 20, wherein the step (c) is performed at a temperature of 100° C. to 220° C.

22. The method for preparing the polyester film of claim 16, wherein the polyester resin is prepared, before the step (a), through the steps of:
   (a0-1) carrying out an esterification reaction of (i) a dicarboxylic acid and (ii) a diol including 1 mol % to 45 mol % of isosorbide and 65 mol % to 200 mol % of ethylene glycol based on 100 mol % of the total dicarboxylic acid; and
   (a0-2) subjecting the esterification reaction product to a polycondensation reaction so that an intrinsic viscosity, which is measured at 35° C. after dissolving it in orthochlorophenol at a concentration of 1.2 g/dl at 150° C. for 15 minutes, reaches 0.45 dl/g to 0.75 dl/g.

23. The method for preparing the polyester film of claim 22, further comprising, after step (a0-2) and before step (a), (a0-3) crystallizing the polymer prepared by the polycondensation reaction, and (a0-4) subjecting the crystallized polymer to a solid phase polymerization such that the intrinsic viscosity, which is measured at 35° C. after dissolving the polymer in orthochlorophenol at a concentration of 1.2 g/dl at 150° C. for 15 minutes, reaches a value of 0.10 to 0.40 dl/g higher than the intrinsic viscosity of the polymer obtained in step (a0-2).

24. The method for preparing the polyester film of claim 22, wherein in the step (a0-1), the initial mixing molar ratio between the dicarboxylic acid and the diol may be adjusted to 1:1.01 to 1:1.05.

25. The method for preparing the polyester film of claim 22, wherein before the (a0-2) polycondensation reaction, the reaction product obtained by the (a0-1) esterification reaction is allowed to stand at a reduced pressure condition of 400 to 1 mmHg for 0.2 to 3 hours to remove unreacted materials including isosorbide.

26. The method for preparing the polyester film of claim 16, wherein in the step (a), a thermoplastic resin and the polyester resin are simultaneously or sequentially melt-extruded to prepare an undrawn polyester film including a substrate layer formed of the thermoplastic resin, and a resin layer formed from the polyester resin which is laminated on at least one side of the substrate layer.

27. The polyester film of claim 1, wherein the polyester resin is prepared by a method comprising:

(a) carrying out an esterification reaction of (i) a dicarboxylic acid and (ii) a diol comprising from 1 mol % to 45 mol % of isosorbide and from 65 mol % to 200 mol % of ethylene glycol, based on 100 mol % of the total dicarboxylic acid; and (b) subjecting the esterification product to a polycondensation reaction so that an intrinsic viscosity, which is measured at 35° C. after dissolving the reaction product in orthochlorophenol at a concentration of 1.2 g/dl at 150° C. for 15 minutes, reaches 0.45 dl/g to 0.75 dl/g, wherein an initial mixing molar ratio of the (i) dicarboxylic acid to the (ii) diol is from to 1:1.01 to 1:1.05.

* * * * *